Nov. 12, 1963  J. R. OISHEI ETAL  3,110,353
VEHICLE DOOR LOCKING SYSTEM SELECTIVELY CONVERTIBLE
FROM MANUAL TO AUTOMATIC LOCKING
Filed April 20, 1961  4 Sheets-Sheet 1

INVENTOR.
JOHN R. OISHEI and
WILLIAM C. RIESTER
BY

Bean Brooks Buckley + Bean
ATTORNEYS

INVENTOR.
JOHN R. OISHEI and
WILLIAM C. RIESTER
BY
Bean Brooks Buckley + Bean
ATTORNEYS

United States Patent Office

3,110,353
Patented Nov. 12, 1963

3,110,353
VEHICLE DOOR LOCKING SYSTEM SELECTIVELY CONVERTIBLE FROM MANUAL TO AUTOMATIC LOCKING
John R. Oishei, Buffalo, and William C. Riester, Williamsville, N.Y., assignors to Trico Products Corporation, Buffalo, N.Y.
Filed Apr. 20, 1961, Ser. No. 104,379
6 Claims. (Cl. 180—82)

The present invention relates to an improved door locking system for an automotive vehicle.

It is the object of the present invention to provide a door locking system for an automotive vehicle which can be factory-installed in an economical manner for the purpose of providing manual remote locking and unlocking of the vehicle doors and which is readily adaptable to simple and economical conversion in the field by the addition of certain components with a minimum of labor to provide a door locking system which also provides automatic door locking in response to the normal operation of the vehicle, maintains a holding force on the vehicle door locks during predetermined conditions of operation of the vehicle, and releases the holding force on said door locks after the predetermined condition ceases to exist to permit the doors to be unlatched from within the vehicle while permitting the door locks to keep the doors locked against opening from outside of the vehicle. Other objects and attendant advantages of the present invention will readily be perceived hereafter.

In accordance with the present invention a simple manual remote locking and unlocking arrangement is economically installed in the vehicle at its time of manufacture, while the vehicle is in a stripped condition. This system is capable of effecting manual remote locking of all of the vehicle doors or manual remote unlocking of certain and preferably less than all of the vehicle doors. Included in the system are the pre-existing latch locks which are normally otherwise provided in the vehicle doors as standard equipment. The system also includes fluid pressure door locking motors which are operatively coupled to each of the latch locks. In addition a single conduit is coupled to each fluid pressure motor for selectively conducting pressurized fluid thereto from a suitable fluid pressure source, such as the engine intake manifold. A vacuum tank may be operatively associated with the intake manifold to provide a source of vacuum when the vehicle engine is not in operation, as is well known in the art. As noted above, the installation of the foregoing components in the vehicle doors is an easy matter and therefore low in labor cost when the vehicle is still stripped during the building thereof. The system includes a master control which includes a manually actuable control valve in the circuit with the above mentioned conduits. The master control is preferably mounted on the rear of the vehicle dashboard with the control knob protruding from the front thereof. When the control knob on the master control is manually moved in a first direction it will place the door locking motors in communication with the above mentioned source of fluid pressure. This will cause the motors to move the latch locks to a locked condition to thereby prevent opening of the vehicle doors from the outside of the vehicle. After the knob is released a venting arrangement within the master control causes the fluid pressure motors to be vented through the above-mentioned single conduits, and the latch locks will be able to be unlocked from within the vehicle without the interference from the fluid pressure motors but will remain in a locked condition because of their inherent construction. If the vehicle operator desires to unlock a vehicle door from a remote position he need merely manipulate the above-mentioned control knob in a second direction. The control knob is connected to a fluid pressure pump which forms a part of the master control, and manipulation of the control knob in the second direction provides a positive fluid pressure which is opposite to the negative fluid pressure at the source. This positive pressure is conducted through suitable conduits in the master control to one of the door locking motors through its respective above-mentioned single conduit in communication therewith. The positive pressure actuates the fluid pressure motor in an opposite direction than the negative pressure and therefore effects the unlocking of the latch lock to which it is routed. In the present instance there is only one door locking motor which is thus selectively unlocked in the foregoing manner. This door is the front passenger's door, but, if desired, the arrangement can provide for unlocking both right passengers' doors or all the doors. Since the above-mentioned pump generates its own positive pressure whenever it is manually actuated, there need be no source of energy provided in the vehicle which is independent of the energy provided by the vehicle operator himself. Thus after the vehicle operator has entered the vehicle he can unlock certain other of the vehicle doors from a remote position regardless of the fact that there is no source of energy available in the vehicle.

After the automotive vehicle, having an installation such as described above, is in the field it may be desirable for the vehicle owner to install an automatic door locking system. The purposes for such an automatic installation may be twofold, namely, to cause the doors to be locked automatically in response to the normal operation of the vehicle, thereby obviating the necessity for effecting manual locking, and to cause certain of the door locks to be held locked against opening from within the vehicle under certain conditions of vehicle operation to thereby prevent accidental door openings from within the vehicle, as by children. The foregoing conversion from a manual to an automatic system can be achieved with a minimum of expense in accordance with the present invention inasmuch as the pre-existing installation for providing manual remote locking and unlocking can be used in its entirety as a part of the automatic locking system. To effect the conversion it is only necessary to make a slight change in the existing manual system and add an automatic control arrangement. More specifically, the above-mentioned control valve includes a converter valve which is movable from a first position wherein it provides the necessary fluid circuit to give the above described manual remote locking and unlocking to a second position where it provides a fluid circuit which provides automatic locking in addition to said manual locking. In addition, the above-mentioned master control includes a conduit connection for receiving a conduit leading from the above-mentioned automatic control arrangement which is added to the pre-existing manual arrangement. Broadly, the automatic control arrangement is responsive to the movement of the speedometer drive gear in the transmission to thereby effect communication between the fluid pressure source and the door locking motors in response to predetermined conditions of vehicle movement, as when the vehicle is traveling above a predetermined speed. The foregoing communication thus automatically actuates all of the door locking motors to place the latch locks in a locked position. Furthermore, as long as the vehicle is moving above a predetermined speed, the source of fluid pressure is maintained in communication with the lock actuating motors through the single conduits connected thereto to thereby maintain a holding force on the latch locks to prevent their being accidentally unlatched from within the vehicle while the vehicle is in motion above said predetermined speed. When the vehicle's speed is reduced below said predetermined speed, the speedometer-drive responsive control terminates the communication between the vacuum source and the fluid pressure motors and also ultimately permits the fluid pressure motors to be vented through said single conduits to thereby permit the vehicle doors to be unlatched from within the vehicle. However, as noted above, the vehicle door latch locks are of such a construction that when the vehicle is brought to a stop and the fluid pressure motors are vented the latch locks will remain locked against unlocking from outside of the vehicle when the outside door handles are manipulated, thereby protecting the vehicle occupants against unauthorized intrusion.

In its more specific aspects, the automatic control arrangement referred to above, which is adapted to be added to the pre-existing manual lock actuating system to convert it to an automatic locking system, includes a motion detector, a relay valve, and a fluid pressure accumulator. The motion detector is installed between the speedometer cable drive on the transmission and the speedometer cable itself, the latter being removed from its normal position on the transmission to permit insertion of the motion detector. It will readily be appreciated that the rate at which the speedometer cable drive turns is a measure of the speed of the vehicle and is thus used as a source of intelligence for effecting automatic locking of the doors. The motion detector intermittently places the vacuum source in communication with a chamber within the above mentioned relay valve while the vehicle is in motion above a predetermined speed. Such intermittent communication causes vacuum impulses to be supplied to the relay valve. The chamber of the relay valve has a vacuum responsive control mechanism which permits communication between the source of vacuum and the door locking motors through the above-mentioned master control valve when the motion detector pump supplies vacuum impulses thereto in excess of a predetermined rate. The chamber of the relay valve to which the above mentioned vacuum impulses are supplied also contains a controlled bleed which vents it to atmosphere. When the vacuum impulses supplied to the relay valve are in excess of a predetermined rate the relay valve will cause the door locking motors to be placed in communication with the vacuum source and the latter will cause the door locking motors to exert a holding force on the latch locks as long as the vehicle is traveling above a predetermined speed. However, when said predetermined rate is not attained the controlled bleed will vent the relay valve and cause it to bleed to atmosphere to thereby cause the door locking motors to be vented so that they no longer exert a holding force on the latch locks, and after this force is no longer exerted, the vehicle doors can be opened from within the vehicle.

In accordance with another aspect of the present invention an accumulator is provided for cooperation with the relay valve to cause the latter to supply fluid pressure constantly to the door locking motors irrespective of changes of conditions affecting the relay valve. More specifically, the accumulator acts to cause the relay valve to have a snap type of action so that it will either be open to permit communication between the fluid pressure motors and the vacuum source or will be closed to cause the fluid pressure motors to be vented. The accumulator will not permit the relay valve to flutter during certain periods of operation when the valve is changing from one condition to another. This aspect of the present invention will also be more fully understood hereafter.

The present invention will be more fully understood when the following portions of the specification are read in conjunction with the accompanying drawings wherein.

Figure 1:
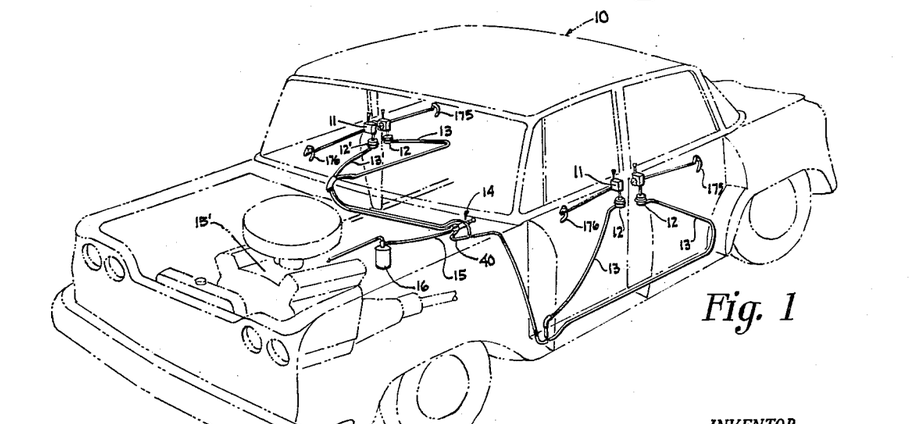
FIG. 1 is a fragmentary perspective view of a manual remote lock actuating system installed in an automotive vehicle.

In FIG. 1 an automotive vehicle 10 is shown having a manual remote door locking system installed therein. Each of the vehicle doors has a latch lock 11 installed therein in the conventional manner. Fluid pressure motors 12 are suitably mounted within all of the vehicle doors, except the front passenger's door which contains motor 12'. All of these motors, which are identical, are coupled to latch locks 11 as explained in greater detail hereafter. Motor 12' in the front passenger's door has a single conduit 13' in communication therewith leading from master control 14, and motors 12 are also in communication with master control 14 through conduits 13. Master control 14 is mounted on the vehicle dashboard as by neck 15[11] thereof protruding through the dashboard and a collar (not shown) threaded thereon to effect such attachment. Also in communication with master control 14 is a conduit 15 which leads from a suitable source of vacuum such as the engine intake manifold. A vacuum tank 16 may be located intermediate the ends of conduit 15 to supply a source of vacuum under conditions when there is no manifold vacuum, as when the engine is not in operation.

The foregoing system, consisting of relatively few parts, can be easily installed during the process of fabricating the vehicle in a simple manner with relatively little labor. This system is perfectly capable of providing manual remote locking and unlocking of the vehicle doors at the option of the vehicle operator and, as will more fully appear hereafter, includes the basic components of a fully automatic system. When master control 14 is set up for manual operation converter valve 17 is in the position shown in FIGS. 3 and 4. When master control 14 is in its normal deactivated condition the components thereof will occupy the positions shown in FIGS. 3, 4, 5, 6 and 10. More specifically, valve 18 (FIGS. 3, 5 and 10) will be biased to a closed position on its seat by spring 19.

Furthermore, valve 20 (FIGS. 3, 6 and 10) will be unseated against the bias of spring 21 by the action of spring 22 having one end thereof anchored on shoulder 23 (FIG. 3) and the other end thereof in contact with piston 24. Piston 24, in turn, is fixedly mounted on the reduced end portion of shaft 25, the end of which is in abutting relationship with one end 26 (FIG. 10) of stem 27, the other end 28 of which abuts valve 20.

Figure 3:
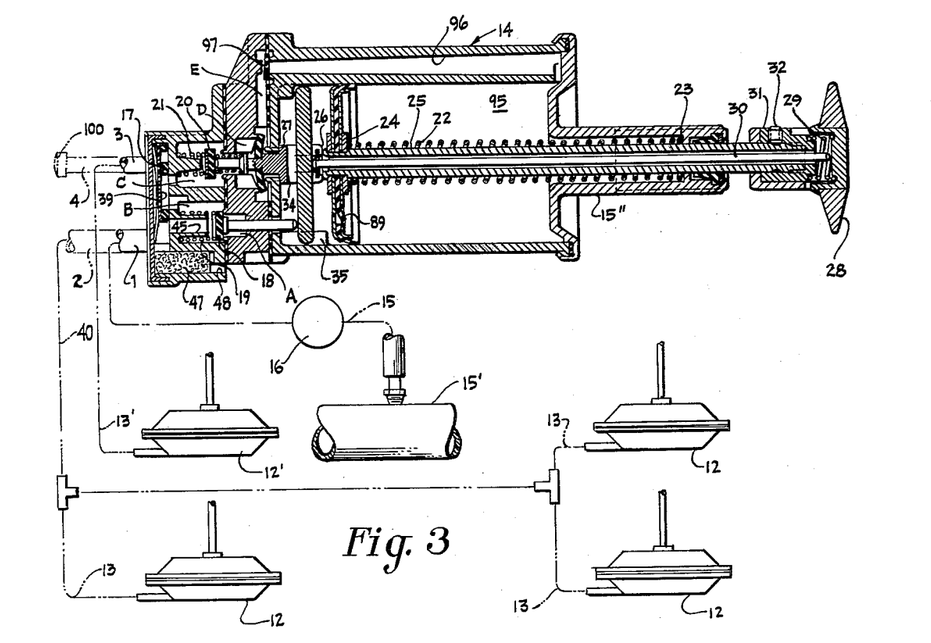
FIG. 3 is a schematic view of the door locking system of FIG. 1 with the master control thereof partially in cross section.
Figure 9:
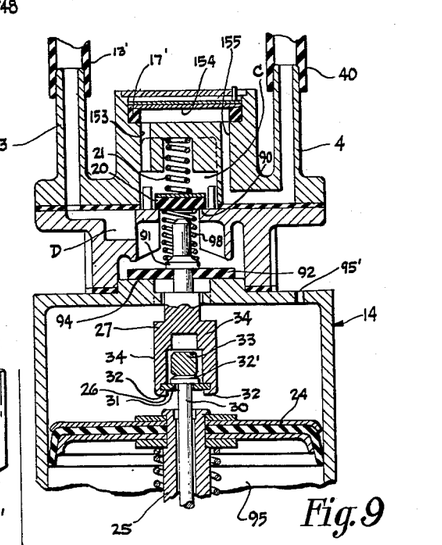
FIG. 9 is a view taken generally along line IX—IX of FIG. 7.
Figure 10:
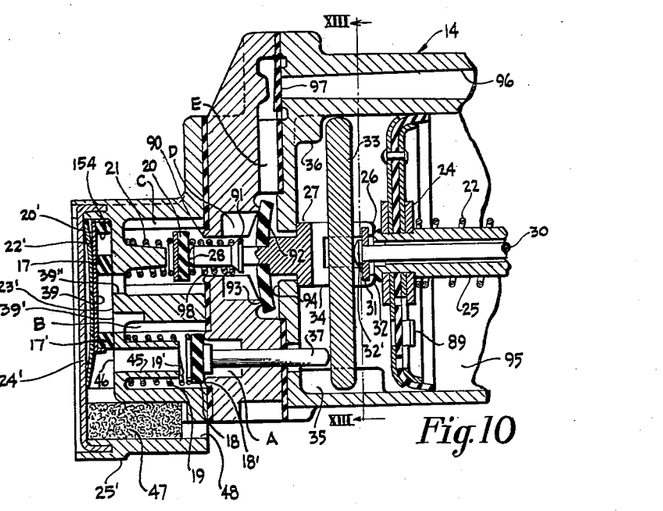
FIG. 10 is an enlarged view of the end of the master control shown in FIG. 3.
Figure 11:
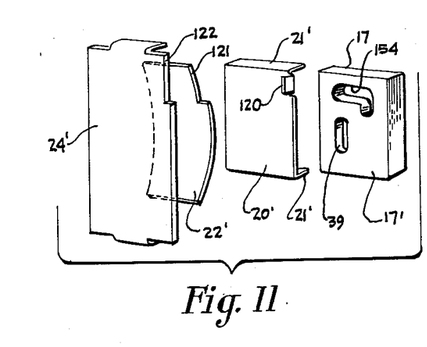
FIG. 11 is an exploded view showing the construction of the converter valve and its related structure.
Figure 13:
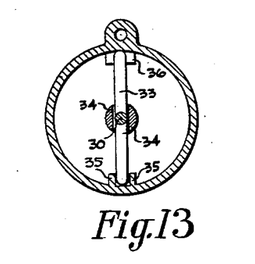
FIG. 13 is a view taken along line XIII—XIII of FIG. 10.

When it is desired to effect manual remote locking of the vehicle doors it is merely necessary to move knob 28 to the left (FIG. 3) against the bias of spring 29. When control knob 28 moves to the left, pin 30 (FIGS. 3 and 10) will move to the left also while stem 25, in which pin 30 is mounted, remains stationary. Knob 28 is mounted on shaft 25 for limited axial movement by anchoring member 31 fixedly secured on shaft 25 by said screw 32. The end of pin 30 has a washer 31 loosely mounted thereon and this washer is secured within stem 27 as by staking at 32 (FIG. 9 and 10). Pin 30 can slide in washer 31 and head 32′ on pin 30 prevents the latter from becoming disengaged from stem 27. A floating lever 33 has the central portion thereof loosely positioned between bifurcation 34 (FIGS. 3, 5, 9 and 10) and the lower portion thereof positioned between lugs 35 (FIGS. 3, 10 and 13). As stem 30 moves to the left, head 32′ thereof will abut the central portion of lever 33 and cause the upper end thereof to engage fulcrum 36. This will cause the lower end thereof to abut the end of pin 37 on which valve 18, noted above, is mounted. The foregoing will cause valve 18 to be unseated against the bias of spring 19 and cause chamber A (FIGS. 5 and 10) to be placed in communication with chamber B. Chamber A is always in communication with conduit 15 mounted on nipple 1, conduit 15 leading from the intake manifold 15′. Chamber B is in turn in communication with chamber C (FIG. 10) which is in communication with chamber D, the communication between chambers B and C being effected through groove 39 (FIGS. 3 and 10) of converter valve block 17′ of converter valve 17 which is in the position shown in FIGS. 4 and 10 when the master control 14 is set up for manual operation. In the foregoing respect chamber B terminates at aperture 39′ and chamber C terminates at aperture 39″, and groove 39 effects communication between these apertures. From FIG. 11 it can be seen that converter valve 17 includes a block 17′ in which groove 39 is located. A cover plate 20′ having flanges 21′ overlies block 17′ and cooperates therewith to close one side of groove 39 (FIG. 10) to cause the latter to act as a conduit, as described above. A spring 22′ biases the valve block 17′ toward valve seat 23′. A cover 24′ (FIG. 10) is staked within the housing 25′ at the end of master control 14. The assembly of the elements shown in FIG. 11 into the condition shown in FIG. 10 causes valve block 17′ to occupy the position shown in the latter figure.

Figures 4, 5, 6, 7:
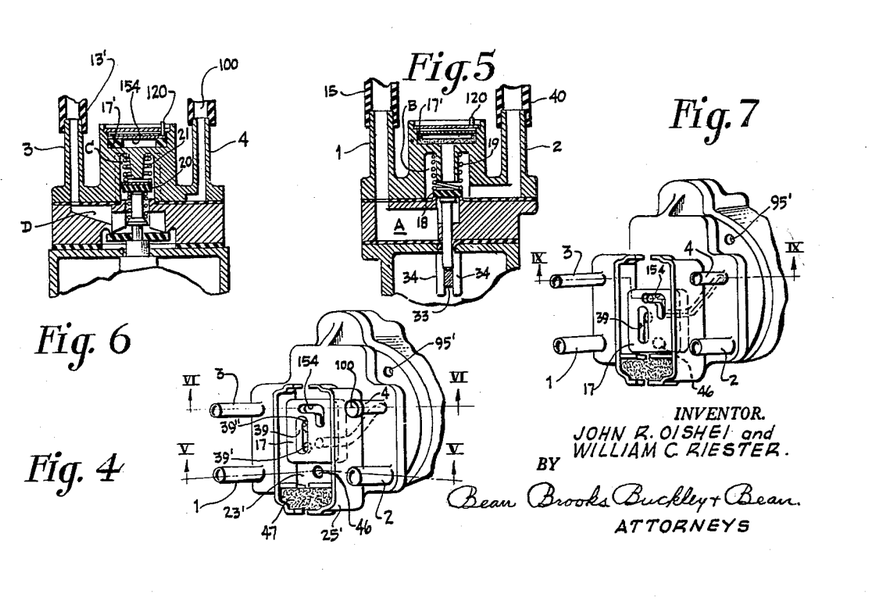
FIG. 4 is a fragmentary perspective view of the end of the master control valve of FIG. 3 with certain parts omitted in the interests of clarity.
FIG. 5 is a view taken along line V—V of FIG. 4.
FIG. 6 is a view taken along line VI—VI of FIG. 4.
FIG. 7 is a fragmentary perspective view of the end of the master control of FIG. 3 with the converter valve moved to a position to provide automatic operation, certain parts of the valve having been omitted in the interest of clarity.

Nipple 2 (FIGS. 3 and 5) of master control 14 is in communication with chamber B and conduit 40 is mounted thereon. Conduit 40 in turn leads to conduits 13 which are in communication with door locking motors 12 mounted in the doors on the driver's side of the vehicle and the rear door only on the other side of the vehicle. Nipple 3 (FIGS. 3 and 6) is in communication with chamber D and has conduit 13′ mounted thereon which is in direct communication with door locking motor 12′ in the front passenger's door of the vehicle. As noted above, since chambers A, B, C and D are all placed in communication with each other and the source of vacuum, after valve 18 is unseated, vacuum will be caused to communicate with door locking motors 12 through single conduits 13 in communication therewith and with motor 12′ through conduit 13′. This will cause evacuation of chamber 42 (FIG. 8) of each of motors 12 and cause diaphragms 43 therein to be deflected downwardly and carry motor shaft 44 downwardly also to effect locking of locks 11. It will be noted that when valve 18 is moved in the above manner to effect the above described communication it moves from its seat 18′ (FIG. 10) to its seat 19′ located at the end of conduit 45 which in turn terminates at aperture 46 (FIGS. 4 and 10). Aperture 46, in turn, as can be seen from FIG. 4, is not covered by converter valve block 17′ and can communicate with the atmosphere through filtering material 47 which is in communication with the atmosphere through aperture 48. When valve 18 is seated on seat 19′ it prevents chamber B from being vented to the atmosphere through the above-described path.

When knob 28 is released after the door locking motors 12 have effected locking of latch locks 11, spring 19 will expand to return valve 18 to its position on seat 18′. At this time chamber B will be in communication with the atmosphere through conduit 45, aperture 46, filtering material 47 and aperture 48. However, since chamber B is in communication with chambers C and D, all of which are in communication with the door locking motors in the vehicle, the door locking motors will be vented to permit manual manipulation of the vehicle door locks from within the vehicle without interference from the motors.

As noted above, the latch locks 11 will be actuated to a locked condition whenever the diaphragms 43 of motors 12 are deflected downwardly as a result of the communication between the vacuum source and such motors through the above enumerated conduits or energy transferring means. In this respect latch locks 11 operate in the following manner: A bell crank lever 55 is pivotally mounted on housing 56 by a pin 57. The shaft 58 of a conventional manual door locking and unlocking pin 59 extends through the moulding (not shown) of the vehicle door. Shaft 58 is fixed to one end of bell crank lever 60 (FIG. 12) which is adapted to pivot about pin 61, the other end of lever 60 fitting within notched recess 62 of link 63. Link 63 is pivotally mounted on pin 64 which extends from flange 65 positioned at a right angle to plate 66 of housing 56. As can be seen from FIG. 12, when shaft 58 is depressed link 63 will pivot in a clockwise direction about its pivot pin 64 to cause the portion 67 of the link 63 to move downwardly and carry prong 68 downwardly with it, prong 68 fitting within the slotted portion 70 of link 63. It will be noted that a snap-acting spring 71 (FIG. 12) has one end 72 anchored on flange 65 and the other end 73 anchored in link 63. Thus when manual locking pin 59 is depressed to a locked condition (either manually or by the action of the door locking motor), it is the snap spring 71 which maintains link 63 in a locked position after the locking force provided by the door locking motor is removed.

Figures 8, 12:
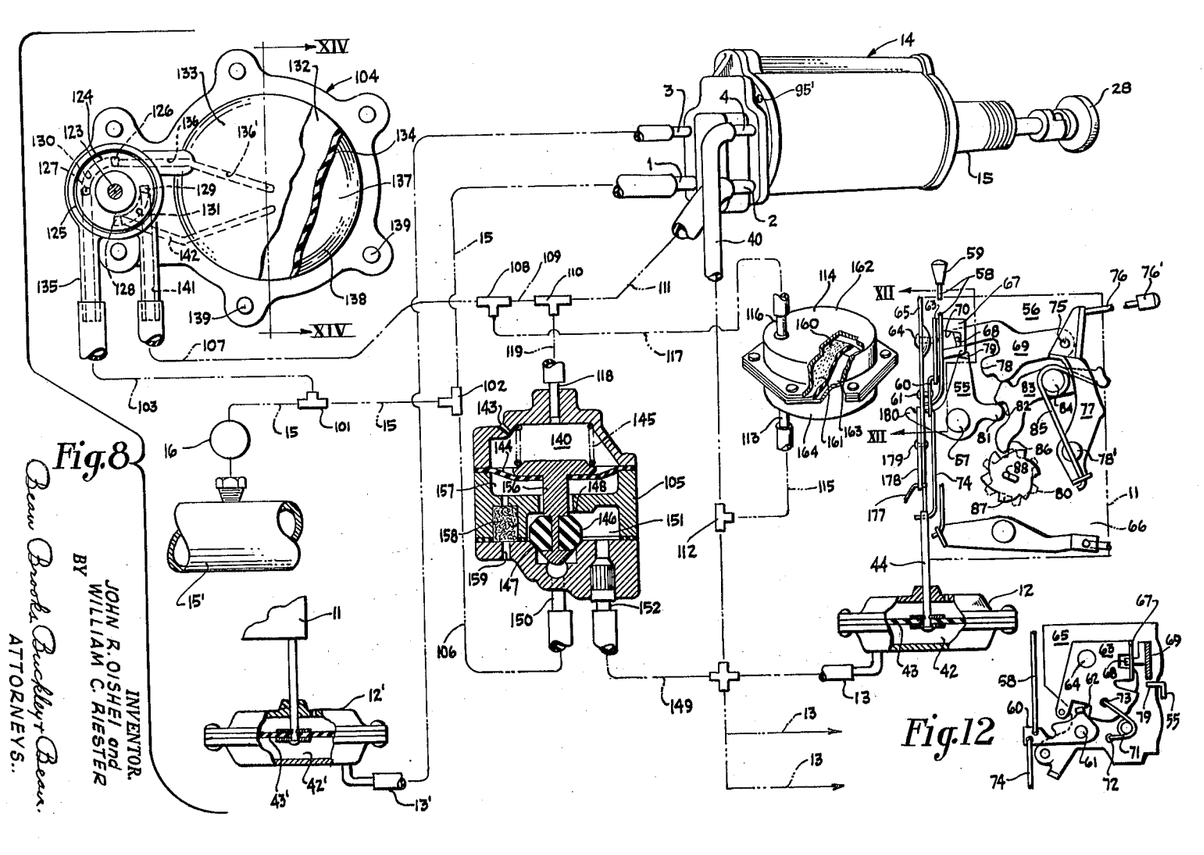
FIG. 8 is a schematic view partly in perspective and partly in cross section showing how the manual system of FIG. 3 is modified to provide automatic lock actuation.
FIG. 12 is a view of the lock structure taken along line XII—XII of FIG. 8.

Shaft 44 of the fluid pressure motor 12 is coupled to shaft 74 which in turn is coupled to bell crank lever 60 (FIG. 12). Thus the downward movement of motor shaft 44 in response to the existence of vacuum in motor chamber 42 will cause the same action caused by the downward movement of shaft 58, namely, a downward movement of the leg of bell crank lever 60 to thereby pivot link 63 to a locked position as shown in FIG. 12.

Figures 2, 14:
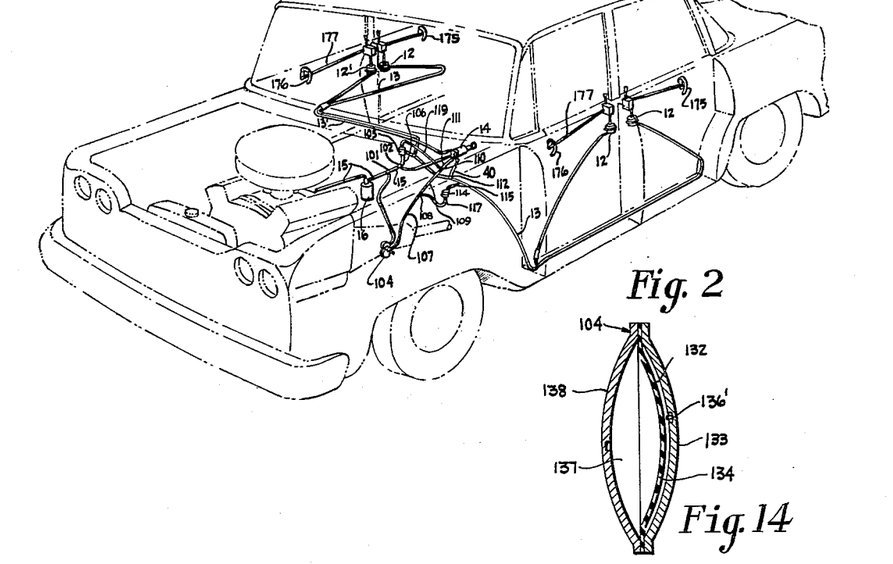
FIG. 2 is a fragmentary perspective view of an automotive vehicle containing the system of FIG. 1 which has been modified to provide automatic lock actuation.
FIG. 14 is a view taken along line XIV—XIV of FIG. 8.

After link 69 has been pivoted in a counterclockwise direction about pivot pin 75, due to the fact that the pivoting movement of link 63 moves prong 68 of link 69 downwardly, the movement of pin 76 to the left, as occurs when the outside door handle or button 76′ is manipulated, will cause lever 77 to pivot counter-clockwise about pin 78′ and cause link 69 (attached to lever 77 by pin 75) to move to the left in FIG. 2. However, the end 78 of link 69 will not engage flange 79 of bell crank lever 55. Thus the manipulation of the outside door handle will be ineffective for unlocking because the movement of link 69 will not cause lever 55 to pivot in a counter-clockwise direction to free latch 80 as described in detail hereafter.

It is only after link 69 has been pivoted about pin 75 in a clockwise direction from its position shown in FIG. 8, as a result of either the pressurizing of motor chamber 42 (or 42'), or the upward movement of pin 59 that the end 78 may engage flange 79 when the outside door handle is manipulated. After the end 78 of link 69 engages flange 79 of bell crank lever 55 in response to movement of pin 76 to the left during a door unlatching operation, lever 55 will pivot in a counterclockwise direction about pin 57 and the leg 81 (of lever 55), which is within the recessed portion 82 of lever 83, will cause the latter to pivot in a clockwise direction about its pivot pin 84 against the bias of spring 85. This in turn will cause the tongue 86 of lever 83 to cease engagement with ratchet wheel 87 which is in turn coaxially mounted on shaft 88 with the rotary door latch 80. When the above described locking arrangement for the rotary door latch 80 is released through the operation of the above described linkage, as a result of the actuation of button 76', latch 80 is free to move relative to the striker plate (not shown) of the door jamb to permit the vehicle door to be pulled to an open position.

From the foregoing description it will readily be appreciated that whenever any of the motor chambers 42 of motors 12 or 42' of motor 12' are evacuated, the diaphragms in these motors will pull the motor shafts attached thereto downwardly thereby effecting locking of the latch locks with which they are associated. When chambers 42 and 42' of the door locking motors are being subjected to vacuum these motors will resist the unlocking of the latch locks by the use of manual unlocking pins 59. However, after control knob 28 is released chambers 42 and 42' of the motors are vented to the atmosphere in the above described manner to permit manual unlocking of the latch locks from within the vehicle without interference from the motors associated therewith. However, as noted above, snap-acting springs 71 cause the latch locks to remain in the positions in which they were last placed after the locking force produced by the motors is removed. Thus, notwithstanding the fact that motors 12 and 12' are no longer actuated the latch locks will remain in a locked condition against unlatching from outside of the vehicle.

The manual lock actuating system provides for effecting remote manual unlocking of the passenger's front door only, but, as noted above, may be modified to include any other or all of the vehicle doors. If unlocking of the front passenger's door is desired, so as to permit a passenger to enter the vehicle, knob 28 (FIG. 3) is pulled to the right. Knob 28, being in engagement with anchoring member 31 affixed to shaft 25, will pull this shaft to the right. Check valve 89 on piston 24 will be closed. During the initial movement of shaft 25 to the right stem 27 will also move to the right as a result of the expansion of springs 21 and 98 (FIG. 9). This movement will continue until valve 20 engages seat 90 (FIG. 9) as a result of the expansion of spring 21 and until valve 92, which is loosely mounted on stem 27, is seated on seat 94 as a result of the biasing force exerted by spring 98 on collar 91 which is thus forced into engagement with valve 92. As shaft 25 continues its movement to the right in FIG. 3, the end thereof will cease abutting end 26 of stem 27 (FIG. 9). The air in chamber 95 (FIG. 3) will be compressed and this compressed air will be routed through conduit 96 past check valve 97 and into chamber E (FIGS. 3 and 10) of master control 14. However, since valve 92 is biased to a position on seat 94 by spring 98, chamber E will be in communication with chamber D, which in turn is in communication with nipple 3 (FIG. 6) on which conduit 13' leading to motor 12' is mounted. The compressed air in conduit 13' will be routed to chamber 42' of motor 12' (FIG 8) and cause diaphragm 43' to be deflected upwardly, this movement being opposed to the movement experienced when chamber 42' was evacuated. The foregoing action of the compressed air is equivalent to moving locking pin 59 upwardly during an unlocking action. In the foregoing manner, manual remote unlocking of the front passenger's door is effected. It will be noted that the seating of valve 20 on seat 90, as noted above, when knob 28 is pulled to effect unlocking, terminates communication between chambers D and C (FIG. 9). As noted above, when converter valve 17 is in the manual operation position of FIGS. 3, 4 and 10, chambers B and C are in communication with each other through groove 39 and chamber B is vented to the atmosphere. It is the foregoing seating action of valve 20 which prevents chamber D from being vented to the atmosphere via chambers C and B. However, if for any reason the pressure in chamber D exceeds the biasing force of spring 21 when valve 20 is seated, valve 20 will unseat and the compressed air in chamber D will be dumped to the atmosphere via chambers C and B. Furthermore, repeated pulling of knob 28 to the right will cause the pressure in motor chamber 42' (FIG. 8) to build up for overcoming any unusual resistance provided by latch lock 11. As noted above, it will be appreciated that nipple 3 of master control 14 can be placed in communication with conduits leading to other of the motors so that manual remote unlocking of other of such motors can be effected, if desired.

When knob 28 is released after manual remote unlocking has been effected in the above manner the valve arrangement in the end of master control 14 returns to the position shown in FIG. 10 to permit chamber D which is in communication with nipple 3 to be vented through aperture 46, conduit 45, chamber B, valve groove 39 and chamber C. Furthermore, during movement of piston 24 to the left in FIGS. 3 and 10, check valve 89 unseats to permit chamber 95 to communicate with the atmosphere through vent 95'. During the foregoing unlocking action, motors 12, which are in communication with chamber B, remain vented because chamber B is vented to the atmosphere. In other words none of the door locking motors in any of the vehicle doors other than the right front passenger's door, is influenced by the manual remote unlocking action. The conduit connections to nipples 1, 2 and 3 have been given above. It is to be noted that nipple 4 has a cap 100 mounted thereon when master control 14 is set up for manual operation. Cap 100 prevents the atmosphere from communicating with nipple 4 and the internal portions of the master control valve in communication therewith.

The above manual remote lock actuating system may be converted to a system which provides automatic locking of the vehicle doors in response to a predetermined condition experienced during normal operation of the vehicle. Motion detector 104, relay valve 105 and accumulator 114 are added to the manual system in the following manner:

From FIGS. 2 and 8 it can be seen that conduit 15 is cut to insert T's 101 and 102. The inlet conduit 103 of motion detector 104 is coupled to an outlet of T 101 and relay valve 105 is coupled to T 102 by conduit 106. Furthermore, the outlet conduit 107 of the motion detector 104 is in communication with nipple 2 of master control 14 through nipple 108, conduit 109, nipple 110 and conduit 111, conduit 40 having been removed from its previous mounting on nipple 2 shown in FIG. 3. Conduit 40, however, has the end thereof which was previously mounted on nipple 2 placed on nipple 4 after cap 100 (FIG. 3) has been removed therefrom. However, a T 112 is placed in conduit 40 and one outlet of the T is placed in communication with nipple 113 of accumulator 114 through conduit 115. In addition one outlet of T 108 which is in communication with conduit 107 is placed in communication with nipple 116 of accumulator 114 through conduit 117. One outlet of T 110 is placed in communication with nipple 118 of relay valve 105 through conduit 119. Conduit 13' retains its previous position between motor 12' and nipple 3 of master control 14. In addition to the foregoing changes tab 120 on cover plate 20' (FIGS. 5, 6 and 11) is moved downwardly to cause converter valve block 17' to move downwardly from its position shown in FIG. 4 to its position shown in FIG. 7 to thereby place the internal conduits within master control 14 in condition for automatic operation. It will be noted that flanges 21' of cover plate 20' mounted on valve block 17' cause the valve block to move with the cover plate during the foregoing manipulation. Notches 121 and 122 in the spring 22' and cover 24', respectively, permit the foregoing movement of nipple 120 to take place. Furthermore, detector 104 is mounted at the speedometer cable take-off of the transmission, as will be explained in greater detail hereafter. With the addition of the above-mentioned components which do not form a part of the system of FIGS. 1 and 3 and with the above enumerated changes, the pre-existing manual remote lock actuating system can be converted to an automatic lock actuating system in an extremely simple manner while retaining all of the components which were previously used for manual operation.

After the foregoing changes have been effected automatic locking of the vehicle doors in response to the attaining of a predetermined speed by the vehicle is effected and the door locking motors are caused to maintain a holding force on the door locks as long as the vehicle exceeds a predetermined speed to thereby prevent accidental door openings from within the vehicle. In this respect detector 104 is operatively associated with the speedometer cable drive of the vehicle. This aspect of the present invention may be identical to the subject matter disclosed in application Serial No. 70,320 filed November 18, 1960, and now Patent No. 3,042,135. Only the barest essentials of the foregoing filed application are deemed necessary for a description of the present subject matter. More specifically, detector 104 includes a fitting which engages a drive gear in the vehicle transmission in lieu of the speedometer cable take-off which previously engaged such drive gear but was removed to permit the installation of the detector 104. The speedometer cable is thereafter mounted on detector 104 so that the detector is inserted between the speedometer drive on the transmission and the speedometer cable. The speedometer take-off from the transmission drives shaft 123 to which rotary valve 124 is attached. Valve 124 rotates on valve seat 125 in which apertures 126, 127, 128 and 129 are located. Grooves 130 and 131 selectively bridge various pairs of apertures 126, 127, 128 and 129. When valve 124 is in the position shown in the drawing the vacuum tank 16 will communicate with chamber 132 (FIGS. 8 and 14) of detector 104, chamber 132 being defined by housing portion 133 and flexible diaphragm 134. More specifically, this communication is effected through conduit 15, nipple 101, conduit 103, nipple 135, aperture 127, groove 130, aperture 126 and conduit 136 in detector 104. Conduit 136 merges with groove 136' on the inside surface of detector 104 (FIGS. 8 and 14). When chamber 132 is thus evacuated, flexible diaphragm 134 will tend to deflect to the right (FIG. 14), or out of the plane of the drawing (FIG. 8), to thereby tend to create a rarified or evacuated condition in chamber 137 which is defined by housing portion 138 and the other side of diaphragm 134. It will be appreciated that diaphragm 134 is sandwiched between housing halves 133 and 138 which are held together by rivets 139. When diaphragm 134 is deflected as a result of the evacuating of chamber 132 there will be a tendency to evacuate chamber 140 to relay valve 105 through nipple 118, conduit 119, nipple 110, conduit 109, nipple 108, conduit 107, nipple 141, aperture 129, valve groove 131, aperture 128 and conduit 142 in detector 104. After valve 124 has turned a quarter of a turn clockwise so that groove 130 of valve 124 bridges apertures 126 and 129 and groove 131 bridges apertures 128 and 127, chamber 137 will be evacuated by the vacuum source and chamber 132 will be in communication with chamber 140 of relay valve 105. Thus the movement to the left in FIG. 14 of diaphragm 134 as a result of the evacuation of chamber 137 will cause an evacuation of relay valve chamber 140. As valve 124 rotates in response to the rotation of the speedometer cable, vacuum impulses produced in the foregoing manner will be continually supplied to chamber 140 of relay valve 105 against the venting effect provided by vent 143 in communication with chamber 140. When the vacuum impulses are supplied to chamber 140 in the above described manner with sufficient rapidity diaphragm 144 will be lifted upwardly against the bias of spring 145. The upward movement of diaphragm 144 will be accompanied with an upward movement of poppet valve 146 from its lower seat 147 to its upper seat 148. After valve 146 leaves its seat 147 and becomes seated on seat 148 communication will be permitted between conduit 106 leading from the vacuum tank 16 and conduit 149 which is in communication with conduits 13 leading to motors 12, the foregoing communication between conduits 106 and 149 being effected through nipple 150, relay valve chamber 151 and nipple 152. Thus, automatic locking of the doors in which motors 12 are situated will be effected. Further, the evacuation which occurs through relay valve chamber 151 in the foregoing manner will also cause automatic locking of the right front passenger's door by the actuation of motor 12' in the following manner: Chamber 42' of motor 12' is evacuated through conduit 13' (FIG. 8) which is mounted on nipple 3 (FIG. 9), the latter being in communication with the evacuated conduit 149 leading from relay valve 105 through master control chamber D, chamber C (which is in communication with chamber D when valve 20 is in its normal unseated position, as shown in FIG. 10), conduit 153 (FIG. 9) leading from chamber C to groove 154 of converter valve block 17' and conduit 155 which is in communication with nipple 4. The foregoing communication between the vacuum source and the door locking motors will automatically exist as long as the vehicle is traveling above a predetermined speed. In this respect the bleed 143 of relay valve 105 is so proportioned with respect to the frequency of the vacuum impulses so that locking of the vehicle doors in this particular instance will occur when the vehicle attains a speed of 7 or 8 miles per hour and the holding force will be maintained on the door locks by the door locking motors as long as the vehicle is traveling in excess of such speed. When the vehicle speed drops below 7 or 8 miles per hour the holding force provided by the door locking motors will cease because the frequency of the vacuum impulses supplied to chamber 140 will be insufficient to hold diaphragm 144 of relay valve 105 deflected upwardly against the bias of spring 145. When such a condition occurs spring 145 will expand and cause poppet valve 146 to return to its lower seat 147 from its upper seat 148. Thereupon conduit 149 which leads to all of the door locking motors 12 and 12', as described in detail above, will cause such motors to be vented inasmuch as conduit 149 itself is vented through nipple 152, valve chamber 151, the space surrounding valve stem 156, valve chamber 157, filtering material 158 and vent 159. It will be appreciated, of course, that the vehicle speed at which relay valve operates can be set at any desired value or can be made responsive to the initial increment of movement of the vehicle, as set forth in the above-mentioned copending application Serial No. 70,320.

It will be noted that the venting of motors 12 and 12' occurs through the above-mentioned path and not through aperture 46 in the master control housing which was previously utilized to effect venting during manual operation because aperture 46 is now covered by converter valve block 17'.

The rear door latch locks 11 which are positioned in the rear doors of the vehicle possess the selective freewheeling features in Patent No. 2,849,251 which render the inside door handles 175 ineffective for unlatching the latch locks when the door locking pins 59 are in a depressed condition either in response to the operation of the automatic door locking system or as a result of having been depressed manually. Furthermore, while the vehicle is rolling, the force of the door locking motors 12 exerted on the door locking pins 59 will prevent these pins from being lifted upwardly to render the freewheeling feature ineffective. The front doors may have the selective freewheeling features, noted above, or, if desired, may incorporate the features wherein the handles 176 are coupled to the links 177 which, in turn, are connected to levers 178 (FIG. 8) so that the movement of link 177 out of the plane of the drawing (FIG. 8) will cause the top of lever 178, which is hooked about leg 180 of lever 55, to pivot into the plane of the drawing about pin 179 and cause bell crank lever 55 to pivot counterclockwise to unlatch the vehicle door in the manner described above. The selective freewheeling feature, noted above, prevents the mechanism of the latch lock itself from operating when the rear inside door handles 175 are manipulated while the latch locks are in a locked condition but permits these rear door handles to unlatch the latch locks when the latter are in an unlocked condition.

Notwithstanding that the above enumerated modifications were made in the manual system, it is still capable of providing manual remote locking and unlocking of the vehicle doors when knob 28 is manipulated in the same manner described above. More specifically, when knob 28 is pushed to the left in FIG. 8, valve 18 (FIG. 10) will be unseated to permit nipple 1 in communication with conduit 15 (FIG. 5), coming from the vacuum source and in communication with chamber A, to communicate with chamber B (FIG. 5), which is in communication with nipple 2 on which conduit 111 is mounted, conduit 111 having replaced conduit 40, as noted above. Conduit 111 (FIG. 8) in turn communicates with chamber 140 of relay valve 105 through nipple 110, conduit 119 and nipple 118. Furthermore, conduit 111 is ultimately in communication with nipple 141 of detector 104. Evacuation of chamber 140 of relay valve 105 will cause poppet valve 146 to move from its lower seat 147 to its upper seat 148, as described above during the automatic operation. This will permit communication between the vacuum source and conduit 149 through conduit 106, nipple 150, valve chamber 151 and nipple 152. As noted above, conduit 149 is in communication with door locking motors 12 and 12' through the above enumerated paths and thus the manipulation of control knob 28 will result in the remote manual actuation of all of the vehicle door locks to a locked condition. As noted above, conduit 111, which is in communication with chamber 140 in the above described manner, also ultimately communicates with nipple 141 of detector 104. However, since the vehicle will be at a standstill when knob 28 is pushed to provide manual lock actuation, detector valve 124 will be stationary and nipple 141 will be "dead-ended" and, therefore, the fact that conduit 111 is in communication with nipple 141 will in no way affect the above-described manual operation. When knob 28 is released, valve 18 returns to its seat to terminate the evacuation of relay valve chamber 140 whereupon chamber 151 of the relay valve will be vented when poppet valve 146 returns to seat 147, and this venting will be communicated to the door locking motors through the same path through which they were evacuated. As in the manual remote unlocking operation described above, if it is desired to effect manual remote unlocking of the right front passenger's door it is merely necessary to pull knob 28 to the right in FIG. 8. The identical action described above with respect to manual remote unlocking occurs notwithstanding that the system is now set up to also provide automatic locking, and it is therefore deemed unnecessary to repeat such above-described action.

The accumulator 114 (FIG. 8) acts to prevent valve 146 in relay valve 105 from fluttering when it changes conditions. More specifically, assuming that the detector 104 produces impulses at an increasing rate which approaches the rate necessary to cause diaphragm 144 of relay 105 to be deflected upwardly, the same evacuating impulses tending to evacuate chamber 140 also tend to evacuate chamber 160 of accumulator 114 through conduit 117, chamber 160 being defined by flexible diaphragm 161 and wall 162. The foregoing tends to deflect diaphragm 161 upwardly. However, as soon as poppet valve 146 moves off of its lower seat 147 the vacuum from tank 16 in communication with conduit 106 will be in communication with the lower chamber 163 of accumulator 114 because said lower chamber is in communication with conduit 149 (FIG. 8). The evacuation of chamber 163, which is defined by diaphragm 161 and the lower housing portion 164 of accumulator 114, will cause diaphragm 161 to be deflected downwardly because of the existence of a greater vacuum in the lower chamber 163 than in the upper chamber 160. The reason for this is that the lower chamber 163 is in constant communication with the vacuum source when poppet valve 146 moves off of seat 147, whereas upper chamber 161 is only in intermittent communication with the vacuum source because of the action of detector 104. Furthermore, lesser vacuum exists in upper chamber 160 because of the bleed produced by vent 143 in relay valve 105. The downward movement of diaphragm 161 will tend to increase the volume of chamber 160 and thus tend to provide an evacuating effect for chamber 140 of relay valve 105 with which it is in communication. Because of the cumulative evacuating effect due to the action of accumulator 114 and the vacuum impulses supplied to relay valve chamber 140, poppet valve 146 will be caused to snap upwardly to a completely open position, rather than fluttering during the transition between its closed and open positions. Furthermore, as the vehicle slows down, the rate at which the vacuum impulses are supplied to relay valve chamber 140 will diminish to the point where poppet valve 146 tends to move downwardly from its upper seat 148. At this time lower chamber 163 of accumulator 14 will be vented through the relay valve 105. Thus, diaphragm 161 will tend to move upwardly to thereby decrease the vacuum in chamber 140 of relay 105. This sudden decrease of vacuum in chamber 140, as soon as poppet valve 146 is moved downwardly off of its seat 148, will cause a snap type of action wherein poppet valve 146 moves downwardly to its lower seat 147 immediately without fluttering during the transition between its open and closed positions. As can be seen from FIG. 8, accumulator 114 consists only of an upper chamber 160 and a lower chamber 163 with a flexible diaphragm 161 therebetween.

It will also be appreciated that the principles of the present invention are equally applicable to other types of manual door locking systems especially those wherein the door locking motors have dual conduits attached thereto instead of the single conduits described with respect to the instant invention.

It can thus be seen that a vehicle door locking system has been provided which is manifestly capable of achieving the above enumerated objects and while a preferred embodiment has been disclosed it is to be readily understood that the present invention is not to be limited thereto but may be otherwise embodied within the scope of the following claims.

What is claimed is:

1. A door locking system for an automotive vehicle which is selectively convertible from an arrangement for providing manual remote actuation of a vehicle door lock to a system which is capable of providing automatic actuation of said vehicle door lock to a locked condition in response to the normal operation of said vehicle comprising a door in said vehicle, a latch lock operatively associated with said door, motor means operatively coupled to said latch lock, a source of energy in said vehicle, energy transferring means, manually operable control means operatively coupled to said energy transferring means for selectively placing said motor means in communication with said source of energy through said energy transferring means to thereby actuate said latch lock, conversion means operatively associated with said control means for converting said manually actuable system to an automatic system, and means adapted to be installed in said vehicle and operative in conjunction with said converted conversion means for providing automatic actuation of said door lock by placing said motor means in communication with said source of energy through said energy transferring means in response to the normal operation of said vehicle, whereby certain of said elements of said system for providing manual remote actuation of said vehicle door lock may be utilized as components of said automatic locking system 2. A door locking system for an automotive vehicle which is selectively convertible from an arrangement for manual remote locking and unlocking of the vehicle doors to a system which is capable of providing automatic locking of the vehicle doors in response to the normal operation of said vehicle, comprising a door in said vehicle, a latch lock operatively associated with said door, a fluid pressure motor operatively coupled to said latch lock, a source of fluid pressure in said vehicle, conduit means extending between said source of fluid pressure and said fluid pressure motor, first manually actuable control means for selectively effecting communication between said source of fluid pressure and said door locking motor through said conduit means to thereby effect remote locking of said latch lock, means associated with said control means for effecting manual remote unlocking of said latch lock, conversion means operatively associated with said control means for converting said control means to a part of an automatic locking system, and means adapted to be installed in said automotive vehicle in operative relationship with said control means and coupled to said conduit means for automatically providing pressurized fluid to said fluid pressure motor through said conduit means in response to the normal operation of said vehicle to thereby cause automatic locking of said vehicle door lock in addition to said manual remote locking and unlocking, whereby certain of said elements of said system for providing manual remote actuation of said vehicle door lock may be utilized as components of said automatic locking system.

3. A door locking system for an automotive vehicle which is selectively convertible from an arrangement for providing manual remote locking and unlocking of the vehicle doors to a system which is capable of providing automatic locking of the vehicle doors in response to the normal operation of said vehicle, comprising a door in said vehicle, a latch lock operatively associated with said door, a fluid pressure motor operatively coupled to said latch lock, a source of fluid pressure in said vehicle, conduit means extending between said source of fluid pressure and said fluid pressure motor including a single conduit in communication with said fluid pressure motor, first manually actuable control means for selectively effecting communication between said source of fluid pressure and said door locking motor through said single conduit to thereby effect remote locking of said latch lock, pump means associated with said first control means for providing pressurized fluid at said source for transmission through said single conduit for effecting an unlocking of said latch lock, fluid conducting means associated with said first control means adapted to be in a first condition for permitting said manual remote locking and unlocking to be effected, a conduit connection associated with said first control means, said fluid conducting means adapted to be placed in a second condition to permit said conduit connection to be used to conduct pressurized fluid to said door locking motor, and second control means adapted to be coupled to said conduit connection for conducting pressurized fluid to said conduit connection from said fluid pressure source in response to the normal operation of said vehicle to thereby effect automatic locking of said latch lock.

4. A door locking system for an automotive vehicle comprising a plurality of doors in said vehicle, a latch lock operatively associated with each of said doors, a fluid pressure motor operatively coupled to each of said latch locks, a source of fluid pressure in said vehicle, a conduit means including a single conduit in communication with each of said fluid pressure motors for effecting communication between said source of fluid pressure and said fluid pressure motors, first control means manually actuable in a first direction for permitting communication between said source of fluid pressure and said door locking motors through said single conduit means to thereby effect manual remote locking of said latch locks, pump means associated with said first control means, said first control means being manually actuable in a second direction to cause said pump means to produce pressurized fluid which is opposite in sign to the fluid under pressure at said source, means for causing said pressurized fluid of opposite sign to communicate with one of said fluid pressure motors through said single conduit to cause said fluid pressure motor to be actuated in a second direction which is opposite to said first direction to thereby effect remote unlocking of said latch lock, a valve associated with said first control means including a vent for permitting said fluid pressure motors to be vented when said first control means are not actuated to either a locking or an unlocking condition, a conduit connection associated with said first control means, said conduit connection being normally unused when said valve means are in a first position to permit only manual remote actuation of said door locking motors, said valve means being movable to a second position to terminate said venting of said fluid pressure motors produced by said vent, means adapted to be coupled to said conduit connection for providing pressurized fluid to said conduit connection in response to the normal operation of said vehicle, and conduit means associated and operative with said control means when said valve means are in said second position to cause automatic actuation of said door locking motors to a locked condition when said pressurized fluid is provided in response to the normal operation of said vehicle.

5. A door locking system as set forth in claim 4 including means associated with said first control means for permitting manual remote locking and unlocking of said door locks after said valve means have been moved to said second position.

6. A door locking system for an automotive vehicle which is selectively convertible from an arrangement for providing manual remote actuation of a vehicle door lock to a system which is capable of providing automatic actuation of said vehicle door lock to a locked condition in response to the normal operation of said vehicle comprising a door in said vehicle, a latch lock operatively associated with said door, motor means operatively coupled to said latch lock, a source of energy in said vehicle, energy transferring means, manually operable control means operatively coupled to said energy transferring means for selectively placing said motor means in communication with said source of energy through said energy transferring means to thereby actuate said latch lock, conversion means operatively associated with said control means for permitting the conversion of said manually actuable system to an automatic system, and means adapted to be installed in said vehicle and operative in conjunction with said conversion means for providing automatic actuation of said door lock by placing said motor means in communication with said source of energy through said energy transferring means in response to the normal operation of said vehicle, whereby certain of said elements of said system for providing manual remote actuation of said vehicle door lock may be utilized as components of said automatic locking system.

References Cited in the file of this patent
UNITED STATES PATENTS

| | | |
|---|---|---|
| 2,505,401 | Ingres et al. | Apr. 25, 1950 |
| 2,716,568 | Davies | Aug. 30, 1955 |
| 2,936,843 | Adams et al. | May 17, 1960 |
| 2,959,238 | Dyer et al. | Nov. 8, 1960 |
| 2,974,742 | Tyler | Mar. 14, 1961 |